US011904540B2

(12) United States Patent
Feng et al.

(10) Patent No.: US 11,904,540 B2
(45) Date of Patent: Feb. 20, 2024

(54) PRINTING DEVICE

(71) Applicant: Shenzhen Anycubic Technology Co., Ltd., Shenzhen (CN)

(72) Inventors: Gaocheng Feng, Shenzhen (CN); Xinqiao Deng, Shenzhen (CN)

(73) Assignee: SHENZHEN ANYCUBIC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/975,613

(22) Filed: Oct. 28, 2022

(65) Prior Publication Data

US 2023/0140340 A1    May 4, 2023

(30) Foreign Application Priority Data

Oct. 29, 2021    (CN) .......................... 202122637343.7

(51) Int. Cl.
*B29C 64/209* (2017.01)
*B29C 64/112* (2017.01)
*B33Y 30/00* (2015.01)
*B29C 64/232* (2017.01)
*B29C 64/245* (2017.01)
*B29C 64/255* (2017.01)
*B29C 64/236* (2017.01)
*B29C 64/286* (2017.01)
*B29C 64/30* (2017.01)

(52) U.S. Cl.
CPC .......... *B29C 64/209* (2017.08); *B29C 64/112* (2017.08); *B29C 64/232* (2017.08); *B29C 64/236* (2017.08); *B29C 64/245* (2017.08); *B29C 64/255* (2017.08); *B29C 64/286* (2017.08); *B29C 64/30* (2017.08); *B33Y 30/00* (2014.12); *B29K 2995/0021* (2013.01)

(58) Field of Classification Search
CPC ...................................................... B29C 64/112
See application file for complete search history.

(56) References Cited

U.S. PATENT DOCUMENTS

| 6,523,921 B2 * | 2/2003 | Codos ................ B41J 11/00212 |
| | | 347/8 |
| 7,189,344 B2 * | 3/2007 | Rheinberger ......... B29C 64/112 |
| | | 264/16 |
| 10,525,749 B1 * | 1/2020 | Hamelin ................ B41J 25/001 |
| 2007/0070162 A1 * | 3/2007 | Yokoyama ......... B41J 11/00218 |
| | | 347/102 |
| 2017/0246795 A1 * | 8/2017 | Mori ..................... B29C 64/112 |
| 2019/0039386 A1 * | 2/2019 | Schmidt ................... B41J 2/135 |

* cited by examiner

*Primary Examiner* — Atul P. Khare

(74) *Attorney, Agent, or Firm* — Bayramoglu Law Offices LLC

(57) ABSTRACT

A printing device includes: a base; a printing platform, the printing platform being connected to the base; a printing bracket, the printing bracket being fixed on the base; and a printing head assembly, the printing head assembly being connected to the printing bracket and being arranged above the printing platform, and the printing head assembly including a bearing member, a discharging assembly and an optical assembly. The discharging assembly and the optical assembly are both arranged on the bearing member, the discharging assembly is used for providing printing materials of at least two colors for the printing platform, and the optical assembly is used for curing the printing materials on the printing platform. The printing device can implement three-dimensional color printing.

15 Claims, 4 Drawing Sheets

PRINTING DEVICE

CROSS REFERENCE TO THE RELATED APPLICATIONS

This application is based upon and claims priority to Chinese Patent Application No. 202122637343.7 filed on Oct. 29, 2021, the entire contents of which are incorporated herein by reference.

TECHNICAL FIELD

The present application relates to the technical field of printers, and in particular to a printing device.

BACKGROUND

The photo-curing printing technology includes the stereo lithography appearance (SLA) printing technology, the liquid crystal display (LCD) printing technology and the digital light processing (DLP) printing technology. However, most of the existing photo-curing printing technologies can only perform monochrome printing, such that photo-curing printers have limitations when printing models.

SUMMARY

The present application provides a printing device, so as to solve the problem that a photo-curing printer can not print color models.

Embodiments of the present application provide a printing device. The printing device includes:

a base;

a printing platform, the printing platform being connected to the base;

a printing bracket, the printing bracket being fixed on the base; and a printing head assembly, the printing head assembly being connected to the printing bracket and being arranged above the printing platform, and the printing head assembly including a bearing member, a discharging assembly and an optical assembly, wherein the discharging assembly and the optical assembly are both arranged on the bearing member, the discharging assembly is used for providing printing materials of at least two colors for the printing platform, and the optical assembly is used for curing the printing materials on the printing platform.

In the embodiments of the present application, the printing platform is connected to the base, the printing bracket is fixed on the base, the printing head assembly is connected to the printing bracket and is arranged above the printing platform, and when the printing device is operating, the discharging assembly provides the printing materials of at least two colors for the printing platform, and the printing materials on the printing platform are cured by means of the optical assembly, to implement three-dimensional color printing on the printing platform.

BRIEF DESCRIPTION OF THE DRAWINGS

In order to more clearly illustrate the technical solutions of the present application, the accompanying drawings used in the description of the embodiments or the prior art will be briefly described below. Apparently, the accompanying drawings in the following description are only some embodiments of the present application, and those of ordinary skill in the art can further obtain other accompanying drawings according to the accompanying drawings without involving any inventive effort.

DETAILED DESCRIPTION OF THE EMBODIMENTS

The technical solutions in the embodiments of the present application will be clearly and completely described below in conjunction with the accompanying drawings in the embodiments of the present application. Apparently, the embodiments described are some rather than all of the embodiments of the present application. The embodiments described below and features in the embodiments can be combined with each other without conflict. All other embodiments obtained by those of ordinary skill in the art on the basis of the embodiments of the present application without involving any inventive effort fall within the scope of protection of the present application.

The terms "first", "second", etc. in the embodiments of the present application are used to distinguish similar objects, and are not necessarily used to describe a specific order or a precedence order. In addition, the terms "include" and "have" and any variation thereof are intended to cover a non-exclusive inclusion, for example, a process, method, system, product, or apparatus that includes a series of steps or units is not necessarily limited to those steps or units that are explicitly listed, but can include other steps or units not explicitly listed or inherent to such a process, method, product or apparatus. Furthermore, "and/or" used in the present application represents at least one of the connecting objects, such as A and/or B and/or C, which represents including the seven instances of A alone, B alone, C alone, and A and B simultaneously, B and C simultaneously, A and C simultaneously, and A, B, and C simultaneously.

Figure 1:
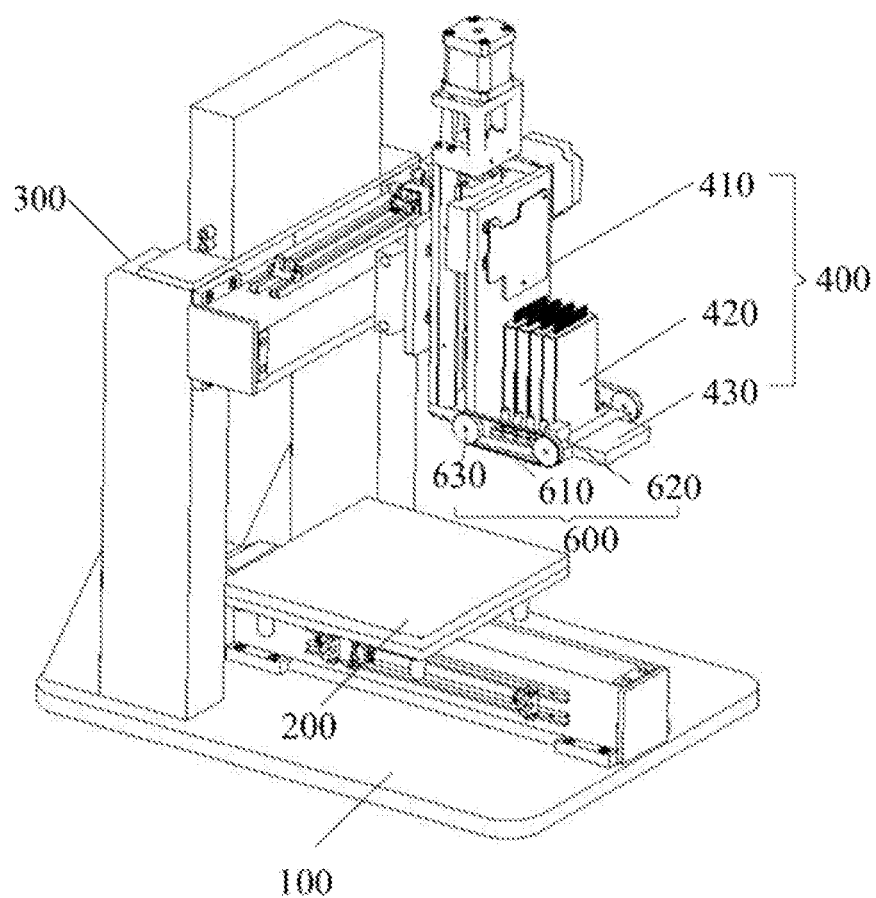
FIG. 1 is a schematic structural diagram of a printing device according to an embodiment of the present application.

With reference to FIG. 1, FIG. 1 is a schematic structural diagram of a printing device according to an embodiment of the present application. As shown in FIG. 1, the printing device includes a base 100, a printing platform 200, a printing bracket 300 and a printing head assembly 400.

The printing platform 200 is connected to the base 100.

The printing bracket 300 is fixed on the base 100.

The printing head assembly 400 is connected to the printing bracket 300 and is arranged above the printing platform 200. The printing head assembly 400 includes a bearing member 410, a discharging assembly 420 and an optical assembly 430. The discharging assembly 420 and the optical assembly 430 are both arranged on the bearing member 410, the discharging assembly 420 is used for providing printing materials of at least two colors for the printing platform 200, and the optical assembly 430 is used for curing the printing materials on the printing platform 200.

It should be understand that the discharging assembly 420 is used for providing the printing materials of at least two colors for the printing platform 200, and by means of a relative movement between the discharging assembly 420 and the printing platform 200, the discharging assembly 420 can provide the printing materials of corresponding colors for corresponding positions on the printing platform 200. Moreover, the printing materials can be ultraviolet (UV) water-based ink, the UV water-based ink is provided for the printing platform 200 by means of the discharging assembly 420, and the UV water-based ink on the printing platform 200 is then irradiated by means of the optical assembly 430 to cure the UV water-based ink, so as to print one layer of a three-dimensional printing. Thus, layers of the three-dimensional printing is printed layer by layer by changing the distance between the discharging assembly 420 and the printing platform 200.

Figure 2:
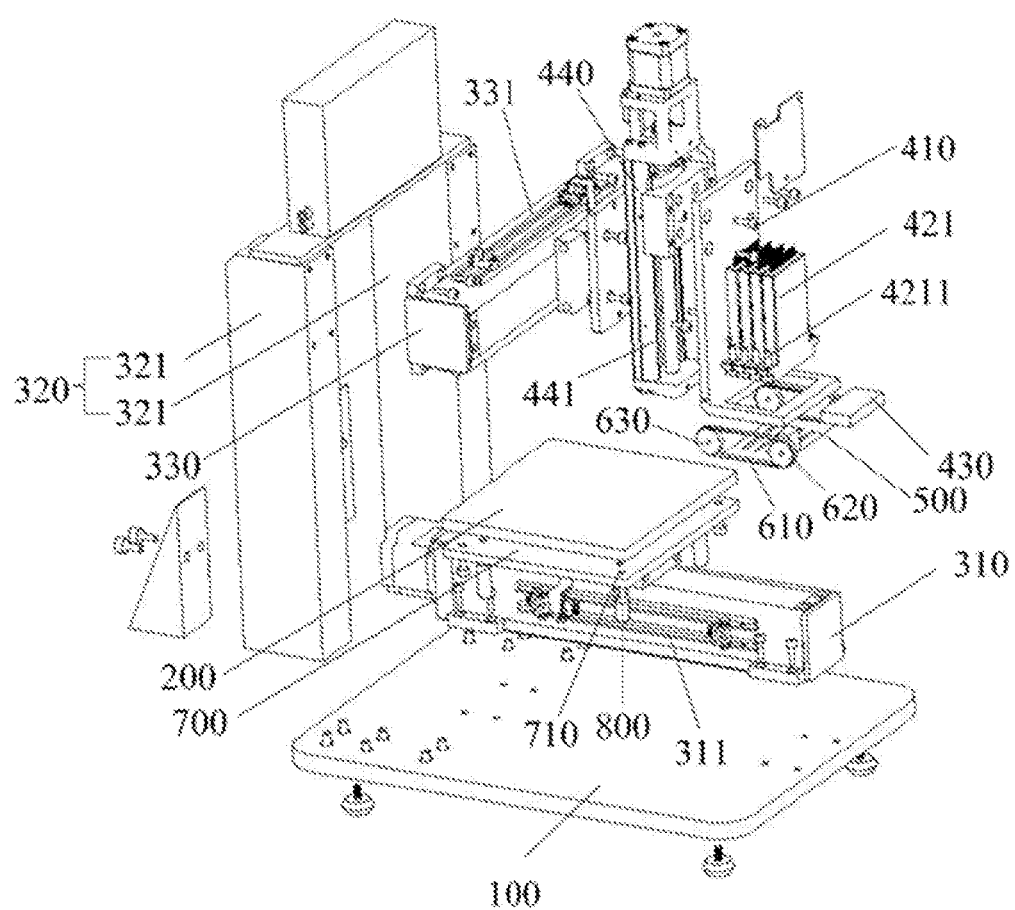
FIG. 2 is an exploded view of a printing device according to another embodiment of the present application.
Figure 3:
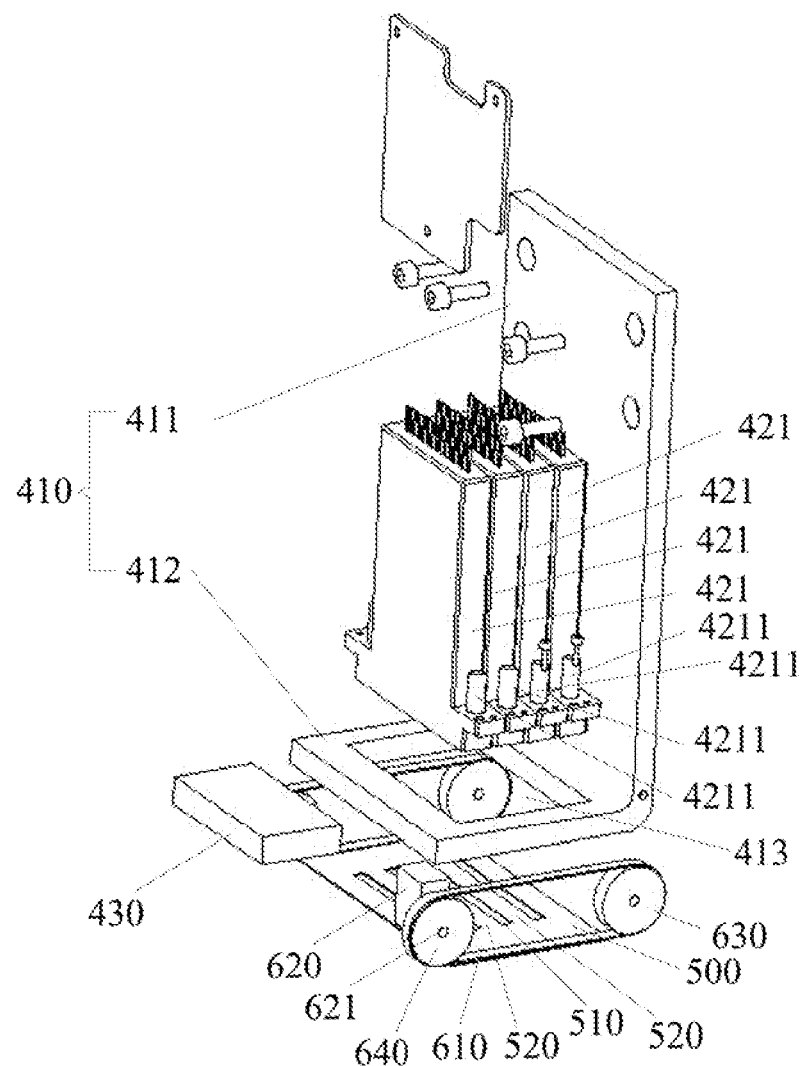
FIG. 3 is a schematic structural diagram of a printing head assembly according to another embodiment of the present application.

As shown in FIGS. 2 and 3, the discharging assembly 420 includes at least two storage boxes 421. The at least two storage boxes 421 are used for storing printing materials of different colors.

A nozzle assembly (not shown in the drawings) is provided on the side of the storage boxes 421 opposite to the printing platform 200, and is used for jetting the printing material to the printing platform 200.

Specifically, the printing materials of different colors can be stored in different storage boxes 421, respectively, and jetted to the printing platform 200 by means of the nozzle assemblies of the storage boxes 421. In some embodiments, the nozzle assemblies can include a plurality of micro-holes (not shown in the drawings) provided at the bottom of the storage box 421 used for jetting printing materials. The plurality of micro-holes are uniformly arranged at the bottom of the storage boxes 421. For example, a plurality of micro-holes can be arranged in two rows at equal intervals at the bottom of the storage box 421.

In some embodiments, the number of storage boxes 421 can be set according to actual requirements, and the corresponding nozzle assemblies can be controlled to jet the printing materials to the printing platform 200 according to the color of a product to be printed.

In the embodiment, the at least two storage boxes 421 are used for storing the printing materials of different colors, and the nozzle assemblies are provided on the storage boxes 421 opposite to the printing platform 200, and is used for jetting the printing material to the printing platform 200, to print at least two colors on the printing platform 200.

As shown in FIG. 3, feeding ports 4211 are also provided on the storage boxes 421, and feeding ports 4211 are used for adding the printing material into the storage boxes 421.

The feeding ports 4211 can be in communication with feeding boxes, the feeding boxes can be used for storing a large amount of printing materials of different colors, and during printing, when the printing materials stored in the storage boxes 421 are not enough, the printing materials of corresponding colors can be supplemented by means of the feeding ports 4211. Moreover, the printing materials being added into the storage boxes 421 by means of the feeding ports 4211 can accordingly reduce the storage capacity of the storage boxes 421, that is, the size and weight of the storage boxes 421 can accordingly be reduced, and it is necessary to continuously move the storage boxes 421 during printing to implement three-dimensional printing on the printing platform 200, such that small size and weight of the storage boxes 421 can also contribute to improving printing precision.

In the embodiment of the present application, the printing platform 200 is connected to the base 100, the printing bracket 300 is fixed on the base 100, the printing head assembly 400 is connected to the printing bracket 300 and is arranged above the printing platform 200, and when the printing device runs, the discharging assembly 420 provides the printing materials of at least two colors for the printing platform 200, and the printing materials on the printing platform 200 are cured by means of the optical assembly 430, to implement three-dimensional color printing on the printing platform 200.

As shown in FIGS. 2 and 3, the printing device further includes a light shielding member 500. The light shielding member 500 is movably arranged between the nozzle assemblies and the printing platform 200, so as to switch the nozzle assemblies between a state in which the nozzle assemblies are shielded by the light shielding member 500 and a state in which the nozzle assemblies are not shielded by the light shielding member 500.

It should be understand that in the state in which the nozzle assemblies are not shielded by the light shielding member 500, the nozzle assemblies can jet the printing materials onto the printing platform 200; and when it is necessary to cure the printing materials on the printing platform 200 by means of the optical assembly 430, the nozzle assemblies can be in the state in which the nozzle assemblies are shielded by the light shielding member 500, such that the printing materials left at outlets of the nozzle assemblies are prevented from being cured by the optical assembly 430, that is, the nozzle assemblies are prevented from being blocked.

The light shielding member 500 can be made of a material having excellent light shielding performance, such that light from the optical assembly 430 is prevented from passing though the light shielding member 500 to cure the printing materials left at the outlets of the nozzle assemblies.

In the embodiment, the light shielding member 500 is movably arranged between the nozzle assemblies and the printing platform 200, so as to switch the nozzle assemblies between a state in which the nozzle assemblies are shielded by the light shielding member 500 and a state in which the nozzle assemblies are not shielded by the light shielding member 500, such that the nozzle assemblies are prevented from being blocked due to irradiation of the optical assembly 430.

As shown in FIGS. 2 and 3, at least two first through holes 510 are provided in the light shielding member 500 at intervals.

In the state in which the nozzle assemblies are not shielded by the light shielding member 500, the at least two first through holes 510 are respectively located at vertical projection positions of the nozzle assemblies of the at least two storage boxes 421 on the light shielding member 500.

In the state in which the nozzle assemblies are shielded by the light shielding member 500, positions of the at least two first through holes 510 do not overlap the vertical projection positions of the nozzle assemblies of the at least two storage boxes 421 on the light shielding member 500.

As shown in FIG. 3, the light shielding member 500 can be a light shielding plate, and at least two first through holes 510 are provided in the light shielding plate at intervals, such that in the state in which the nozzle assemblies are not shielded by the light shielding member 500, the at least two first through holes 510 are respectively located at the vertical projection positions of the nozzle assemblies of the at least two storage boxes 421 on the light shielding member 500, that is, the printing materials jetted from the nozzle assemblies can pass through the first through holes 510 to the printing platform 200; and in the state in which the nozzle assemblies are shielded by the light shielding member 500, the positions of the at least two first through holes 510 do not overlap the vertical projection positions of the nozzle assemblies of the at least two storage boxes 421 on the light shielding member 500, that is, the positions where the first through holes 510 are not provided in the light shielding plate are located directly below the nozzle assemblies, and the light shielding plate can block a light propagation path from the optical assembly 430 to the nozzle assemblies.

Further, first through holes 510 can be sized to match the nozzle assemblies. The nozzle assembly including two rows of micro-holes is taken as an example. A first through hole 510 can be a rectangular through hole, a length of the rectangular through hole can match that of the two rows of micro-holes, and a width of the rectangular through hole can match that of the two rows of micro-holes. The above matching arrangement can be understood as that the size of a rectangular through hole is slightly greater than the size of the two rows of micro-holes projected on the light shielding member 500, such that in the state in which the nozzle assemblies are not shielded by the light shielding member 500, the printing materials jetted from the nozzle assemblies are not shielded by the light shielding member 500, and in the state in which the nozzle assemblies are shielded by the light shielding member 500, the light shielding member 500 can shield light emitted from the optical assembly 430 to the nozzle assembly as much as possible.

The light shielding member 500 can also include a plurality of light shielding plates (520). The first through holes 510 are formed at intervals by the plurality of light shielding plates (520) arranged at intervals, a dimension of the first through hole 510 depends on a distance between adjacent light shielding plates (520), that is, the distance between the adjacent light shielding plates (520) needs to be greater than the dimension of the nozzle assembly projected on the light shielding member 500, or the distance between the adjacent light shielding plates (520) needs to be equal to the dimension of the nozzle assembly projected on the light shielding member, such that in the state in which the nozzle assemblies are not shielded by the light shielding member 500, the printing material jetted from the nozzle assembly is not shielded by the light shielding member 500, and the dimension of one of the light shielding plates (520) also needs to be greater than that of the nozzle assembly on the light shielding member 500, or the dimension of one of the light shielding plates (520) also needs to be equal to that of the nozzle assembly on the light shielding member 500, such that in the state in which the nozzle assemblies are shielded by the light shielding member 500, the light shielding member 500 can shield the nozzle assembly.

As shown in FIGS. 2 and 3, the printing device further includes a driving assembly 600. The driving assembly 600 includes a closed synchronous belt 610, a driving mechanism 620 and a synchronous wheel 630. The closed synchronous belt 610 is connected to the light shielding member 500, an output shaft 621 of the driving mechanism 620 is located at a first end of the closed synchronous belt 610, the output shaft 621 is connected to the closed synchronous belt 610, the synchronous wheel 630 is located at a second end of the closed synchronous belt 610 opposite to the first end, and the synchronous wheel 630 is connected to the closed synchronous belt 610.

The driving mechanism 620 is used for driving the output shaft 621 to rotate to drive the closed synchronous belt 610 to move, so as to drive the light shielding member 500 connected to the closed synchronous belt 610 to switch between the state in which the nozzle assemblies are shielded and the state in which the nozzle assemblies are not shielded.

The closed synchronous belt 610 is connected to the light shielding member 500, that is, the light shielding member 500 moves along with a movement of the closed synchronous belt 610.

As shown in FIG. 3, the output shaft 621 of the driving mechanism 620 can be connected to a synchronous wheel 630 as a drive wheel 640, and the drive wheel 640 is connected to the closed synchronous belt 610. Specifically, the drive wheel 640 can be in meshed connection with an inner surface at one end of the closed synchronous belt 610, the synchronous wheel 630 is in meshed connection with an inner surface at the other end of the closed synchronous belt 610, or the synchronous wheel 630 is in engaged connection with an inner surface at the other end of the closed synchronous belt 610, and the drive wheel 640 and the output shaft 621 of the driving mechanism 620 are coaxially arranged. The output shaft 621 is rotated to drive the drive wheel 640 to synchronously rotate, such that the closed synchronous belt 610 is driven to move to switch the light shielding member 500 connected to the closed synchronous belt 610 between the state in which the nozzle assemblies are shielded and the state in which the nozzle assemblies are not shielded.

In some embodiments, the output shaft 621 of the driving mechanism 620 can also be connected to a driving gear, and the driving gear is coaxially arranged with the output shaft 621. The driving gear is connected to the closed synchronous belt 610, and the output shaft 621 is rotated to drive the driving gear to synchronously rotate, such that the closed synchronous belt 610 is driven to move to switch the light shielding member 500 connected to the closed synchronous belt 610 between the state in which the nozzle assemblies are shielded and the state in which the nozzle assemblies are not shielded.

In the embodiment, the driving mechanism 620 is used for driving the output shaft 621 to rotate to drive the closed synchronous belt 610 to move, so as to drive the light shielding member 500 connected to the closed synchronous belt 610 to switch between the state in which the nozzle assemblies are shielded and the state in which the nozzle assemblies are not shielded.

As shown in FIGS. 2 and 3, the bearing member 410 includes a first bearing plate 411 and a second bearing plate 412. A first side of the first bearing plate 411 is perpendicularly connected to a first side of the second bearing plate 412, the first bearing plate 411 is connected to the printing bracket 300, and the optical assembly 430 is arranged on a second side of the second bearing plate 412 opposite to the first side.

A second through hole is provided in the second bearing plate 412, and the discharging assembly 420 is used for providing the printing materials of at least two colors for the printing platform 200 by means of the second through hole.

The first bearing plate 411 is used for being connected to the printing bracket 300, the second bearing plate 412 is used for arranging the optical assembly 430 and the discharging assembly 420, and the discharging assembly 420 can provide the printing materials of at least two colors for the printing platform 200 by means of the second through hole provided in the second bearing plate 412.

In the embodiment, the bearing member 410 includes the first bearing plate 411 and the second bearing plate 412. The first side of the first bearing plate 411 is perpendicularly connected to the first side of the second bearing plate 412. The first bearing plate 411 is connected to the printing bracket 300, and the second bearing plate 412 is used for bearing the discharging assembly 420 and the optical assembly 430, such that a bearing effect of the bearing member 410 can be improved while the bearing member 410 is connected to the printing bracket 300.

Figure 4:
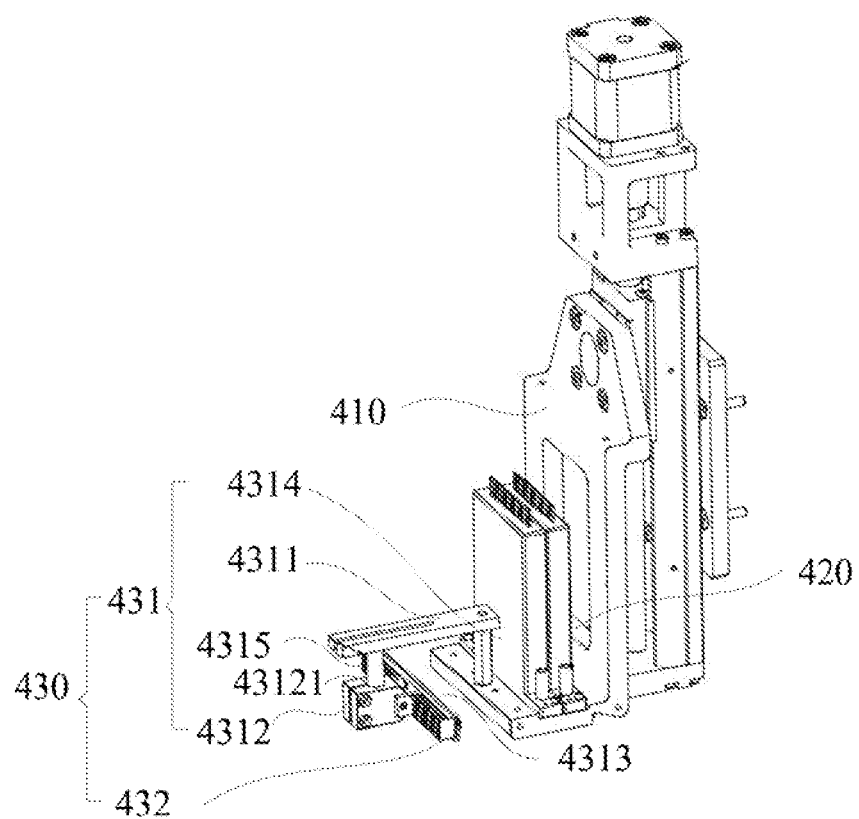
FIG. 4 is a schematic structural diagram of another printing head assembly according to another embodiment of the present application.

As shown in FIG. 4, the optical assembly 430 includes a movable connector 431 and a light emitting device 432. The light emitting device 432 is connected to the bearing member 410 by means of the movable connector 431.

The movable connector 431 is used for adjusting a light emitting direction of the light emitting device 432.

An angle and position of the light emitting direction of the light emitting device 432 relative to the nozzle assembly can be adjusted according to actual requirements. In some embodiments, as shown in FIG. 4, the movable connector 431 can include: a fourth guide rail 4311, a fixing block 4312, a fifth guide rail 4313, a first connecting column 4314 and a second connecting column 4315. A first end of the fourth guide rail 4311 is fixedly connected to the bearing member 410 by means of the first connecting column 4314, the first connecting column 4314 is arranged perpendicular to a lengthwise direction of the fourth guide rail 4311, a fourth sliding groove extending in the lengthwise direction of the fourth guide rail 4311 is provided in the fourth guide rail 4311, a first end of the second connecting column 4315 is in rolling connection with the fourth sliding groove, and the light emitting direction can be adjusted to change along the fourth sliding groove by controlling the position of the second connecting column 4315 in the fourth sliding groove. A third through hole 43121 is provided in the fixing block 4312, the second connecting column 4315 penetrates the third through hole 43121 and is connected to the third through hole 43121, that is the second connecting column 4315 penetrates the third through hole 43121 and is connected to walls of the third through hole 43121, and the light emitting direction can be adjusted to change in an extending direction of the second connecting column 4315 by controlling the position of the fixing block 4312 on the second connecting column 4315. A fifth sliding groove extending in a lengthwise direction of the fifth guide rail 4313 is provided in the fifth guide rail 4313, the lengthwise direction of the fifth guide rail 4313 is perpendicular to that of the fourth guide rail 4311, one end of a side surface of the fixing block 4312 is in rolling connection with the fifth sliding groove, the light emitting device 432 is fixedly arranged on the surface of the fifth guide rail 4313 opposite to the printing platform 200, and the light emitting direction can be adjusted to change in an extending direction of the fifth guide rail 4313 by controlling the position of the fixing block on the fifth guide rail 4313, such that a light source of the optical assembly 430 can be adjusted in multiple degrees of freedom by means of the movable connector 431.

In the embodiment, the light emitting device 432 is connected to the bearing member 410 by means of the movable connector 431, and the movable connector 431 can be adjusted according to a curing effect of the printing materials, such that the light emitting direction of the light emitting device 432 is adjusted, and the curing effect of the printing materials on the printing platform 200 by the optical assembly 430 is thus improved.

As shown in FIG. 2, the printing bracket 300 includes a first guide rail 310, a fixing seat 320 and a second guide rail 330.

The first guide rail 310 is fixedly arranged on the base 100, the first guide rail 310 is provided with a first sliding groove 311 extending in a lengthwise direction of the first guide rail 310, and the printing platform 200 is connected to the first sliding groove 311.

The fixing seat 320 is fixedly and perpendicularly arranged on the base 100.

The second guide rail 330 is fixedly arranged on the fixing seat 320, the second guide rail 330 is arranged perpendicular to the first guide rail 310, the second guide rail 330 is provided with a second sliding groove 331 extending in a lengthwise direction of the second guide rail 330, and the printing head assembly 400 is connected to the second sliding groove 331.

The first guide rail 310 and the second guide rail 330 can be made of guide rail profiles, which have high straightness and are firm and reliable, a sliding wheel can be fixedly provided on the surface of the printing platform 200 opposite to the base 100, the sliding wheel is arranged in the first sliding groove 311 in a rolling manner, and when the printing platform 200 slides relative to the first guide rail 310, the sliding wheel rolls in the first sliding groove 311, and the printing head assembly 400 can also be connected to the second sliding groove 331 by means of the same principle.

Specifically, as shown in FIG. 2, the fixing seat 320 includes two supporting legs 321. The two supporting legs 321 are fixedly arranged on the base 100 at an interval, and a position of the first guide rail 310 on the base 100 partially overlaps a spacing between the two supporting legs 321 on the base 100.

In the embodiment, the first guide rail 310 is fixedly arranged on the base 100, the first guide rail 310 is provided with the first sliding groove 311 extending in the lengthwise direction of the first guide rail 310, and the printing platform 200 is connected to the first sliding groove 311, to implement a movement of the printing platform 200 in the lengthwise direction of the first guide rail 310; the fixing seat 320 is fixedly and perpendicularly arranged on the base 100; and the second guide rail 330 is fixedly arranged on the fixing seat 320, the second guide rail 330 is arranged perpendicular to the first guide rail 310, the second guide rail 330 is provided with the second sliding groove 331 extending in the lengthwise direction of the second guide rail 330, and the printing head assembly 400 is connected to the second sliding groove 331, to implement a movement of the printing head assembly 400 in the lengthwise direction of the second guide rail 330.

In addition, a platform fixing seat 700 can be provided at a bottom of the printing platform 200, a fourth through hole 710 is provided in the platform fixing seat 700, a micrometer head 800 penetrates the fourth through hole 710 and abuts against the printing platform 200, so as to level the printing platform 200, and leveling precision of the printing platform 200 can be improved by adjusting the micrometer head 800.

As shown in FIG. 2, the printing head assembly 400 further includes a third guide rail 440. The third guide rail 440 is arranged perpendicular to the second guide rail 330.

The third guide rail 440 is provided with a third sliding groove 441 extending in a lengthwise direction of the third guide rail 440, and the bearing member 410 is connected to the third sliding groove 441.

It should be understand that the third guide rail 440 can be also made of a guide rail profile, a sliding wheel is provided on the surface of the bearing member 410 opposite to the third sliding groove 441, and the sliding wheel rolls in the third sliding groove 441, to movably connect the bearing member 410 to the third sliding groove 441.

Moreover, the third guide rail 440 is arranged perpendicular to the second guide rail 330, and the second guide rail 330 is arranged perpendicular to the first guide rail 310. That is, the first guide rail 310, the second guide rail 330, and the third guide rail 440 serve as an X axis, a Y axis, and a Z axis of the printing device, respectively, thereby implementing three-dimensional printing of the printing device.

As shown in FIGS. 1 to 4, an embodiment of the present application provides a printing device. The printing device includes a base 100, a printing platform 200, a printing bracket 300 and a printing head assembly 400.

The printing platform 200 is connected to the base 100.

The printing bracket 300 is fixed on the base 100.

The printing head assembly 400 is connected to the printing bracket 300 and is arranged above the printing platform 200. The printing head assembly 400 includes a bearing member 410, a discharging assembly 420 and an optical assembly 430. The discharging assembly 420 and the optical assembly 430 are both arranged on the bearing member 410, the discharging assembly 420 is used for providing printing materials of at least two colors for the printing platform 200, and the optical assembly 430 is used for curing the printing materials on the printing platform 200.

Further, the discharging assembly 420 includes at least two storage boxes 421. The at least two storage boxes 421 are used for storing printing materials of different colors.

The nozzle assemblies are provided on the side of the storage boxes 421 opposite to the printing platform 200, and is used for jetting the printing material to the printing platform 200.

Further, feeding ports 4211 are also provided on the storage boxes 421, and the feeding ports 4211 are used for adding the printing material into the storage box 421.

Further, the printing device further includes a light shielding member 500. The light shielding member 500 is movably arranged between the nozzle assemblies and the printing platform 200, so as to switch the nozzle assemblies between a state in which the nozzle assemblies are shielded by the light shielding member 500 and a state in which the nozzle assemblies are not shielded by the light shielding member 500.

Further, at least two first through holes 510 are provided in the light shielding member 500 at intervals.

In the state in which the nozzle assemblies are not shielded by the light shielding member 500, the at least two first through holes 510 are respectively located at vertical projection positions of the nozzle assemblies of the at least two storage boxes 421 on the light shielding member 500.

In the state in which the nozzle assemblies are shielded by the light shielding member 500, positions of the at least two first through holes 510 do not overlap the vertical projection positions of the nozzle assemblies of the at least two storage boxes 421 on the light shielding member 500.

Further, the printing device further includes a driving assembly 600. The driving assembly 600 includes a closed synchronous belt 610, a driving mechanism 620 and a synchronous wheel 630. The closed synchronous belt 610 is connected to the light shielding member 500, an output shaft 621 of the driving mechanism 620 is located at a first end of the closed synchronous belt 610, the output shaft 621 is connected to the closed synchronous belt 610, the synchronous wheel 630 is located at a second end of the closed synchronous belt 610 opposite to the first end, and the synchronous wheel 630 is connected to the closed synchronous belt 610.

The driving mechanism 620 is used for driving the output shaft 621 to rotate to drive the closed synchronous belt 610 to move, so as to drive the light shielding member 500 connected to the closed synchronous belt 610 to switch between the state in which the nozzle assemblies are shielded and the state in which the nozzle assemblies are not shielded.

Further, the bearing member 410 includes a first bearing plate 411 and a second bearing plate 412. A first side of the first bearing plate 411 is perpendicularly connected to a first side of the second bearing plate 412, the first bearing plate 411 is connected to the printing bracket 300, and the optical assembly 430 is arranged on a second side of the second bearing plate 412 opposite to the first side.

A second through hole is provided in the second bearing plate 412, and the discharging assembly 420 is used for providing the printing materials of at least two colors for the printing platform 200 by means of the second through hole.

Further, the optical assembly 430 includes a movable connector 431 and a light emitting device 432. The light emitting device 432 is connected to the bearing member 410 by means of the movable connector 431.

The movable connector 431 is used for adjusting a light emitting direction of the light emitting device 432.

Further, the printing bracket 300 includes a first guide rail 310, a fixing seat 320 and a second guide rail 330.

The first guide rail 310 is fixedly arranged on the base 100, the first guide rail 310 is provided with a first sliding groove 311 extending in a lengthwise direction of the first guide rail 310, and the printing platform 200 is connected to the first sliding groove 311.

The fixing seat 320 is fixedly and perpendicularly arranged on the base 100.

The second guide rail 330 is fixedly arranged on the fixing seat 320, the second guide rail 330 is arranged perpendicular to the first guide rail 310, the second guide rail 330 is provided with a second sliding groove 331 extending in a lengthwise direction of the second guide rail 330, and the printing head assembly 400 is connected to the second sliding groove 331.

Further, the printing head assembly 400 further includes a third guide rail 440. The third guide rail 440 is arranged perpendicular to the second guide rail 330.

The third guide rail 440 is provided with a third sliding groove 441 extending in a lengthwise direction of the third guide rail 440, and the bearing member 410 is connected to the third sliding groove 441.

It should be noted that the terms "include", "comprise", or any other variant thereof herein is intended to encompass a non-exclusive inclusion, such that a process, method, article, or apparatus that includes a series of elements not only includes those elements, but also includes other elements not explicitly listed, or elements that are inherent to such a process, method, article, or apparatus. In the absence of more restrictions, the element defined by the phrase "including a/an . . . " does not exclude the presence of a further identical element in the process, method, article or device that includes the element. In addition, it should be noted that the scope of the method and device in the embodiments of the present application is not limited to performing functions in order shown or discussed, but can further include performing functions in a substantially simultaneous manner or in a reverse order according to the functions involved. For example, the described method can be performed in an order different from that described, and various steps can be added, omitted, or combined. In addition, features described with reference to certain examples can be combined in other examples.

The embodiments of the present application are described above with reference to the accompanying drawings, but the present application is not limited to the specific embodiments described above, which are merely illustrative and not restrictive. Those skilled in the art can also make many forms in light of the present application without departing from the spirit of the present application and the scope of protection of the claims, and these forms all fall into the scope of protection of the present application.

What is claimed is:

1. A printing device, comprising:
   a base;
   a printing platform, the printing platform being connected to the base;
   a printing bracket, the printing bracket being fixed on the base;
   a printing head assembly, the printing head assembly being connected to the printing bracket, and the printing head assembly comprising a discharging assembly and an optical assembly, wherein the discharging assembly is configured to provide printing materials of at least two colors for the printing platform, and the optical assembly is configured to cure the printing materials on the printing platform;
   nozzle assemblies configured to jet the printing material to the printing platform;
   a light shielding member; and
   a driving assembly comprising a closed synchronous belt for switching the light shielding member between a state in which the nozzle assemblies are shielded and a state in which the nozzle assemblies are not shielded by the light shielding member.

2. The printing device of claim 1, wherein the discharging assembly comprises at least two storage boxes, wherein the at least two storage boxes are configured to store printing materials of different colors; and
   the nozzle assemblies are provided on a side of the at least two storage boxes, and the nozzle assemblies are configured to jet the printing material to the printing platform, wherein the side of the at least two storage boxes is opposite to the printing platform.

3. The printing device of claim 2, wherein feeding ports are provided on the at least two storage boxes, and the feeding ports are configured to add the printing material into the at least two storage boxes.

4. The printing device of claim 2, wherein at least two first through holes are provided in the light shielding member at intervals;
   when the nozzle assemblies are not shielded by the light shielding member, the at least two first through holes are respectively located at vertical projection positions of the nozzle assemblies; and
   when the nozzle assemblies are shielded by the light shielding member, positions of the at least two first through holes do not overlap the vertical projection positions of the nozzle assemblies.

5. The printing device of claim 4, wherein the at least two first through holes are rectangular through holes.

6. The printing device of claim 4, wherein the light shielding member comprises a plurality of light shielding plates; and the at least two first through holes are formed at intervals by the plurality of light shielding plates arranged at intervals.

7. The printing device of claim 6, wherein a distance between adjacent light shielding plates of the plurality of light shielding plates is greater than a dimension of a nozzle assembly of the nozzle assemblies projected on the light shielding member or the distance between the adjacent light shielding plates is equal to the dimension of the nozzle assembly projected on the light shielding member; and wherein a dimension of a light shielding plate of the plurality of light shielding plates is greater than the dimension of the nozzle assembly projected on the light shielding member, or the dimension of a light shielding plate of the plurality of light shielding plates is equal to the dimension of the nozzle assembly projected on the light shielding member.

8. The printing device of claim 2, wherein the nozzle assemblies each comprise a plurality of micro-holes, the plurality of micro-holes are uniformly arranged at a bottom of the storage boxes.

9. The printing device of claim 1, wherein the light shielding member is arranged between the nozzle assemblies and the printing platform.

10. The printing device of claim 1, wherein the driving assembly further comprises a driving mechanism and a synchronous wheel, wherein the closed synchronous belt is connected to the light shielding member, an output shaft of the driving mechanism is located at a first end of the closed synchronous belt, the output shaft is connected to the closed synchronous belt, the synchronous wheel is located at a second end of the closed synchronous belt opposite to the first end, and the synchronous wheel is connected to the closed synchronous belt, and
   the driving mechanism is configured to drive the output shaft to rotate to drive the closed synchronous belt to move, wherein the light shielding member connected to the closed synchronous belt is driven to switch between the state in which the nozzle assemblies are shielded and the state in which the nozzle assemblies are not shielded.

11. The printing device of claim 1, wherein the printing head assembly further comprises a bearing member, and the discharging assembly and the optical assembly are arranged on the bearing member;
    the bearing member comprises a first bearing plate and a second bearing plate, a first side of the first bearing plate is perpendicularly connected to a first side of the second bearing plate, the first bearing plate is connected to the printing bracket, and the optical assembly is arranged on a second side of the second bearing plate opposite to the first side of the second bearing plate; and
    a through hole is provided in the second bearing plate, and the discharging assembly is configured to provide the printing materials of at least two colors for the printing platform through the through hole.

12. The printing device of claim 1, wherein the optical assembly comprises a movable connector and a light emitting device, and the light emitting device is connected to a bearing member through the movable connector; and the movable connector is configured to adjust a light emitting direction of the light emitting device.

13. The printing device of claim 12, wherein the movable connector comprises a fixing block and a connecting column, a through hole is provided in the fixing block, and the connecting column penetrates the through hole and is connected to walls of the through hole.

14. The printing device of claim 1, wherein the printing bracket comprises:
    a first guide rail being fixedly arranged on the base, and being provided with a first sliding groove extending in a lengthwise direction of the first guide rail, the printing platform being connected to the first sliding groove;
    a fixing seat being fixedly and perpendicularly arranged on the base; and
    a second guide rail being fixedly arranged on the fixing seat, the second guide rail being arranged perpendicular to the first guide rail, the second guide rail being provided with a second sliding groove extending in a lengthwise direction of the second guide rail, and the printing head assembly being connected to the second sliding groove.

15. The printing device of claim 14, wherein the printing head assembly further comprises a third guide rail, and the third guide rail is arranged perpendicular to the second guide rail; and the third guide rail is provided with a third sliding groove extending in a lengthwise direction of the third guide rail, and a bearing member is connected to the third sliding groove.

* * * * *